US008137177B2

(12) United States Patent
Tom

(10) Patent No.: US 8,137,177 B2
(45) Date of Patent: Mar. 20, 2012

(54) PIC POKER GAME INCLUDING SUBSET BETTING OPTIONS

(76) Inventor: John B. Tom, Los Angeles, CA (US)

( * ) Notice: Subject to any disclaimer, the term of this patent is extended or adjusted under 35 U.S.C. 154(b) by 440 days.

(21) Appl. No.: 12/391,065

(22) Filed: Feb. 23, 2009

(65) Prior Publication Data

US 2010/0216535 A1 Aug. 26, 2010

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/16; 463/17

(58) Field of Classification Search .................... 463/16, 463/17

See application file for complete search history.

(56) References Cited

U.S. PATENT DOCUMENTS 1,616,884 A 2/1927 Bosley et al.
D169,395 S 4/1953 Schlegelmilch
4,149,728 A 4/1979 Thompson
D270,361 S 8/1983 de Gregorio et al.
4,492,378 A 1/1985 Williams
4,560,171 A 12/1985 Anthony
4,746,126 A 5/1988 Angileri
5,184,821 A 2/1993 Korenek
5,228,698 A 7/1993 Dubarry, Jr.
5,607,161 A 3/1997 Skratula
5,662,330 A 9/1997 Spears
D385,307 S 10/1997 Balkisson et al.
5,676,375 A 10/1997 Pirouzkhah
5,678,821 A * 10/1997 Hedman ...................... 273/292
5,863,041 A 1/1999 Boylan et al.
6,109,611 A 8/2000 Aramapakul
6,264,200 B1 7/2001 Smith
6,688,597 B2 2/2004 Jones
6,712,360 B2 3/2004 Yaple
6,722,655 B1 4/2004 Camero
6,769,693 B2 8/2004 Huard et al.
6,805,353 B2 10/2004 Williams
6,811,153 B1 11/2004 Ko
D527,769 S 9/2006 St. Cyr et al.
7,104,544 B2 9/2006 Reiner et al.
7,165,769 B2 1/2007 Crenshaw et al.
7,195,242 B2 3/2007 Terminel et al.
7,201,656 B2 4/2007 Darder
7,425,177 B2 9/2008 Rodgers et al.

(Continued)

OTHER PUBLICATIONS

Office Action for Patent U.S. Appl. No. 29/259,741, dated Jun. 6, 2006.

*Primary Examiner* — William M. Brewster
(74) *Attorney, Agent, or Firm* — Sheldon Mak & Anderson PC; Danton K. Mak

(57) ABSTRACT

A method for playing a casino poker game, including providing a chance device such as a roulette wheel or a six-sided die, a poker deck of playing cards, and a wagering surface for betting options that include options regarding a subset of a dealt poker hand as well as the full hand; receiving bets in a first playing interval; dealing a plurality of poker hands in a second playing interval; operating the chance device for determining one of the poker hands to play; exposing one card of the determined playing hand; paying winners and collecting from losers regarding the subset betting options; exposing the remaining cards of the determined hand; and paying winners and collecting from losers regarding the full hand betting options.

20 Claims, 3 Drawing Sheets

U.S. PATENT DOCUMENTS

| | | | | |
|---|---|---|---|---|
| 7,614,624 | B2 | 11/2009 | Kling et al. | |
| 2001/0015529 | A1 | 8/2001 | Allen | |
| 2001/0048196 | A1 | 12/2001 | Au-Yeung | |
| 2002/0043766 | A1 | 4/2002 | Berman | |
| 2003/0032471 | A1 | 2/2003 | Darder | |
| 2003/0071415 | A1 * | 4/2003 | Huard et al. | 273/274 |
| 2006/0038348 | A1 | 2/2006 | Schultz | |
| 2007/0052174 | A1 | 3/2007 | Dargue | |
| 2007/0057452 | A1 | 3/2007 | Dargue | |
| 2008/0012231 | A1 | 1/2008 | Dargue | |
| 2008/0224401 | A1 | 9/2008 | Okada | |

* cited by examiner

PIC POKER GAME INCLUDING SUBSET BETTING OPTIONS

BACKGROUND

The present invention relates to casino games, and more particularly to a poker game.

Casino card games of the prior art that include variations utilizing chance devices are known. A variation of poker utilizing a standard roulette wheel is disclosed in U.S. Pat. No. 4,149,728 to Thompson. Other games utilizing special-purpose wheels are disclosed, for example, in U.S. Pat. No. 4,492,378 to Williams, U.S. Pat. No. 5,184,821 to Korenek, U.S. Pat. No. 7,165,769 to Crenshaw et al., and U.S. Pat. No. 7,425,177 to Rodgers et al., and the U.S. Publication No. 2007/0057452 of Dargue. Variations utilizing dice are disclosed in U.S. Pat. No. 5,607,161 to Skratulia, and the published '452 application of Dargue.

These and other casino card games of the prior art are believed to have limited usefulness, typically exhibiting one or more of the following disadvantages:

1. They require non-standard chance devices, whether wheels or dice;
2. They fail to include desirable elements of standard poker;
3. They lack a desired variety of betting options;
4. They are difficult to use due to complex and unusual procedure; and
5. They are ineffective in a casino environment due to excessive play time.

Thus there is a need for a casino poker game that incorporates desired aspects of poker, that provides rapid play with a wide variety of betting options, and is easy to use.

SUMMARY

The present invention meets this need by providing a poker game combining a chance device, such as a standard roulette wheel and/or a standard craps die, with a deck of playing cards. In one aspect of the invention, a method for playing the game includes providing a chance device, a poker deck of playing cards, and a wagering surface for betting options that include options regarding a subset of a dealt poker hand as well as the full hand; receiving bets in a first playing interval; dealing a plurality of poker hands in a second playing interval; operating the chance device for determining one of the poker hands to play; exposing one card of the determined playing hand; paying winners and collecting from losers regarding the subset betting options; exposing the remaining cards of the determined hand; and paying winners and collecting from losers regarding the full hand betting options.

The chance device can include a standard roulette wheel having 36 numbered betting slots and a zero slot, and operating the chance device can include spinning the roulette wheel. Preferably the plurality of poker hands is not greater than six for five-card hands and not greater than five for seven-card hands for there to be a sufficient number of cards in the deck to deal the hands. The number of poker hands can be a sub-multiple of 36, equal numbers of the numbered slots prospectively designating respective ones of the dealt hands, the zero slot also prospectively designating one of the dealt hands. The zero slot can additionally define a sole winning subset betting option.

The roulette wheel can additionally include a double-zero slot, the double zero slot prospectively designating a different one of the dealt hands, the poker deck consisting of 52 cards. The double-zero slot can additionally define another sole winning subset betting option.

The number of poker hands can be six, six each of the numbered slots prospectively designating respective ones of the dealt hands. The poker deck can consist of 52 cards.

The chance device can include a die having different indicia on each of opposite parallel sides, and operating the chance device can include rolling the die onto a substantially level surface, one of the indicia coming to rest on top of the die for determining the hand to be played. Preferably the poker deck of cards includes first and second additional cards for defining respective sole winning subset betting options. In this case, the poker deck of cards can consist of 54 cards. The chance device can consist of a single die.

DRAWINGS

These and other features, aspects, and advantages of the present invention will become better understood with reference to the following description, appended claims, and accompanying drawings, where:

DESCRIPTION

Figure 1:
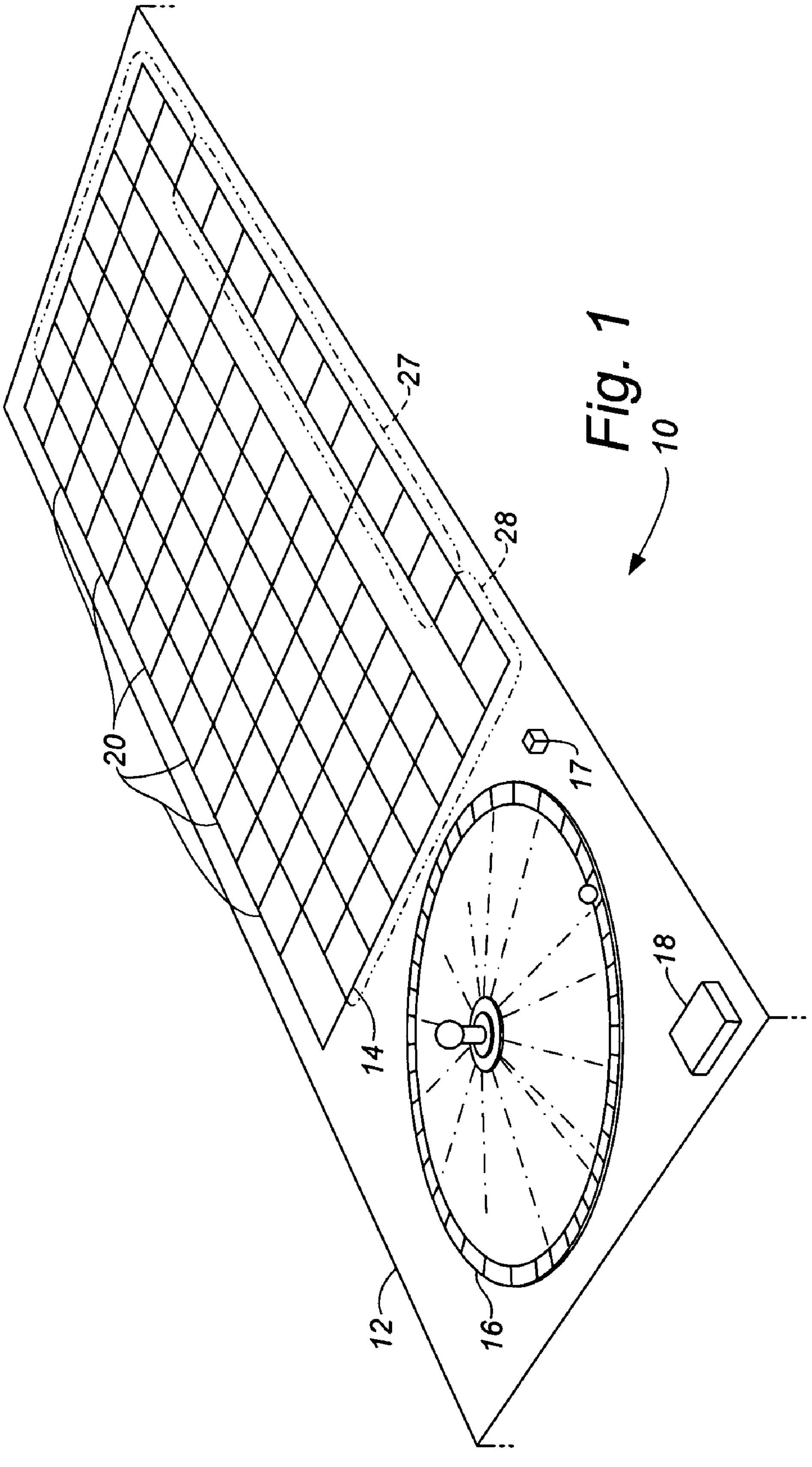
FIG. 1 is a perspective view of a casino poker game according to the present invention.

The present invention is directed to a casino poker game that is particularly effective in providing a variety of betting options with features of known poker games, yet is rapid in play. With reference to FIG. 1 of the drawings, exemplary apparatus 10 for playing casino poker games according to the present invention includes a gaming table 12 having a wagering surface 14, at least one chance device in the form of a roulette wheel 16 and/or a die 17, and a poker deck 18 of playing cards. The apparatus 10 also includes means for holding a plurality of dealt poker hands, which can be respective marked hand locations 20 within the wagering surface 14. An exemplary form of the wagering surface 14 also includes a poker hand betting region 27 and a subset betting region 28.

Figure 2:
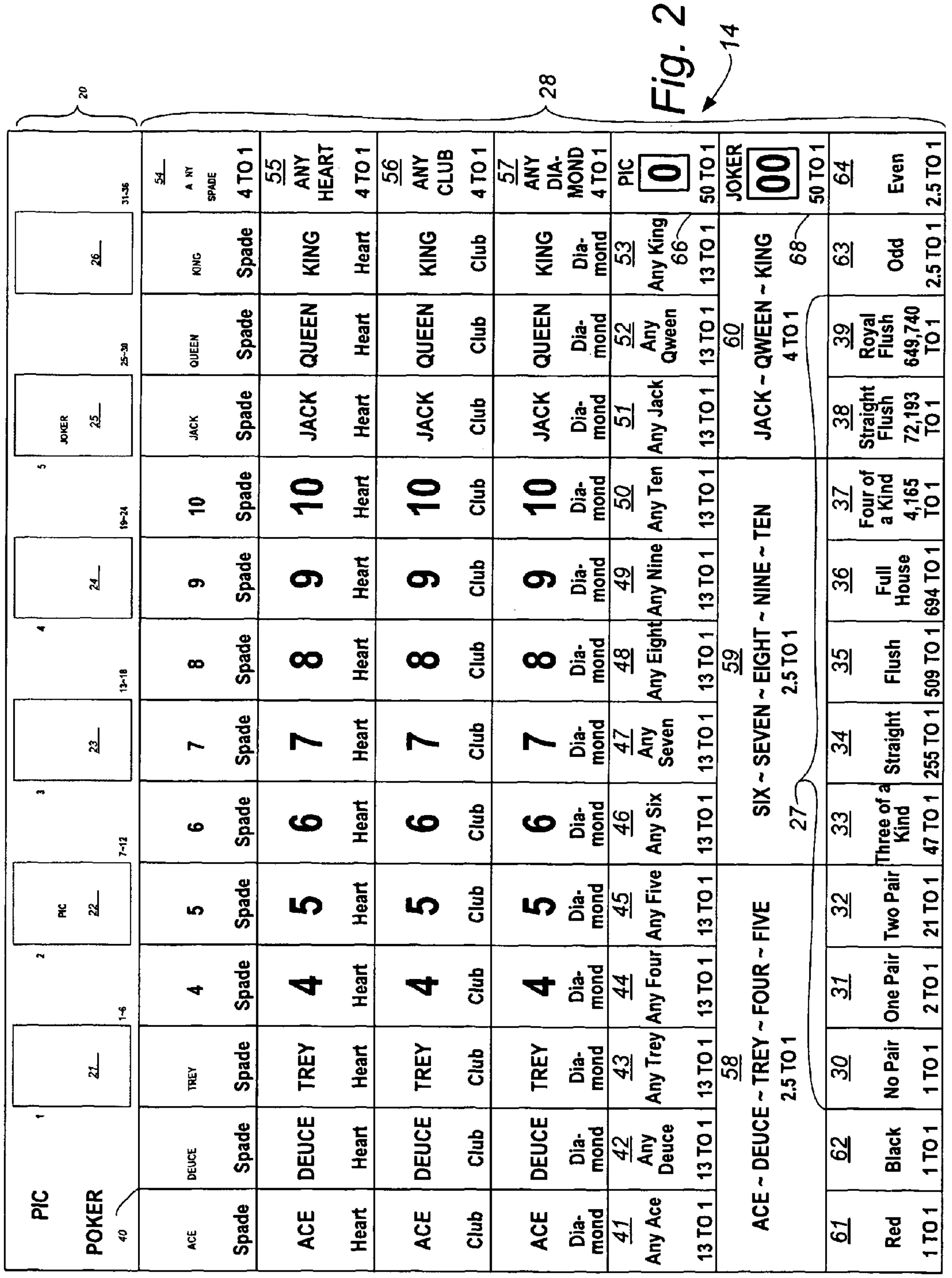
FIG. 2 is a plan view of a wagering surface portion of the poker game of FIG. 1.

As further shown in FIG. 2, the poker hand betting region 27 includes spaces for betting on particular poker hands, namely a "no pair" space 30, a "one pair" space 31, a "two pair" space 32, a "three of a kind" space 33, a "straight" space 34, a "flush" space 35, a "full house" space 36, a "four of a kind" space 37, a " "straight flush" space 38, and a "royal flush space 39. The subset betting region 28 includes a single card array 40 having spaces for each of 52 poker cards, namely "ace", "deuce", "trey", "4" through "10", "jack", "queen", and "king", in each of the "spade", "heart", "club", and "diamond" suits. The subset betting region 28 also includes a plurality of denomination spaces, namely an "any ace" space 41, an "any deuce" space 42, an "any trey" space 43, "any four" through "any ten" spaces respectfully designated 44, 45, 46, 47, 48, 49, and 50, an "any jack" space 51, an "any queen" space 52, and an "any king" space 53; and suit spaces, namely an "any spade" space 54, an "any heart" space 55, an "any club" space 56, and an "any diamond" space 57. Additionally, the subset betting spaces include an any "ace~deuce~trey~four~five" space 58, an any "six~seven~eight~nine~ten" space 59, an any "jack~queen~king" space 60, a "red" space 61, a "black" space 62, an "odd" space 63, and an "even" space 64, as well as a "0" space 66 and a "00" space 68. The "0" space 66 is also marked "PIC" and the "00" space 68 is also marked "JOKER" as further explained below.

In the exemplary configuration of the wagering surface 14, there are six of the poker hand locations 20, respectively designated 21, 22, 23, 24, 25, and 26, and correspondingly marked "1", "2", "3", "4", "5", and "6", for correspondence with indicia of the die 17. The poker hand locations 20 are also marked "1-6", "7-12", "13-18", "19-24", "25-30", and "31-36", respectively, for correspondence with slots of the roulette wheel 16. Further, the location 22 is additionally marked "PIC" for correspondence with the "0" space 66 of the subset betting region 28 and the location 25 additionally marked "JOKER" for correspondence with the "00" space 68 of the betting region 28.

Optionally, the wagering surface 14 can be marked with betting odds. In the exemplary configuration of the wagering surface 14 shown in FIG. 2, odds for pat five-card stud poker hands are shown as "1 to 1" for the "red", "black" and "no pair" spaces 61, 62 and 30; "2 to 1" for the "one pair" space 31; "2.5 to 1" for the "ace . . . five" and "six . . . ten" spaces 58 and 59, the "odd" space 63, and the "even" space 64; "4 to 1 for the suit spaces 54, 55, 56, and 57, and the "jack . . . king" space 60; "13 to 1" for the denomination spaces 41, 42, 43, 44, 45, 46, 47, 48, 49, 50, 51, 52, and 53; "21 to 1" for the "two pair" space 32, "47 to 1" for the "three of a kind" space 33, "255 to 1" for the "straight" space 34, "509 to 1" for the "flush" space 35, "694 to 1" for the "full house" space 36, "4165 to 1" for the "four of a kind" space 37, "72,193 to 1" for the "straight flush" space 38, and "649,740 to 1" for the "royal flush" space 39. Further, odds of 52 to 1 (not shown) can be marked on each space of the single card array 40. Additionally, the "0" and "00" spaces 66 and 68 are each marked "50 to 1". It will be understood that different odds would apply and be so marked in connection with seven-card stud poker hands.

Figure 3:
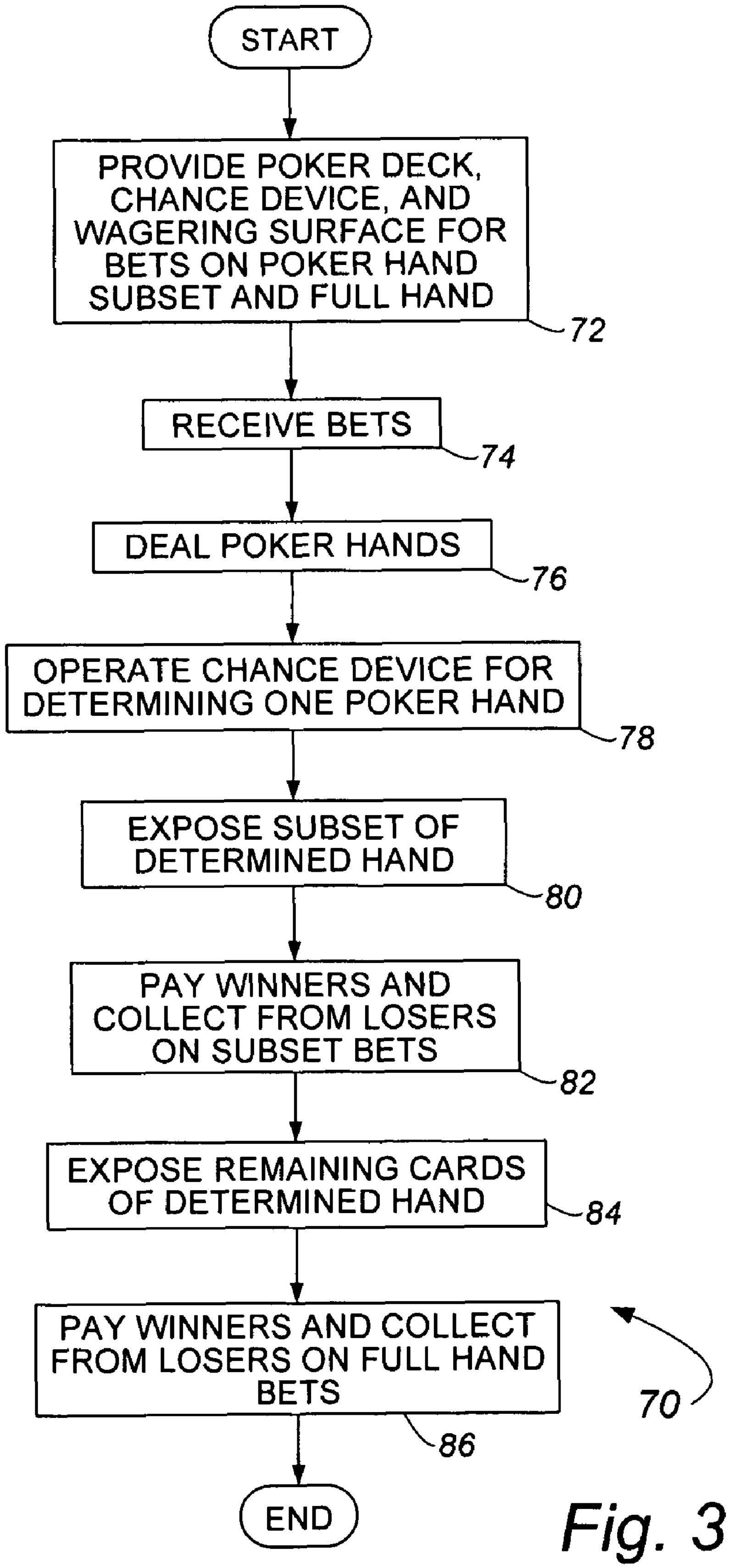
FIG. 3 is a flow chart for play of the poker game of FIG. 1.

With further reference to FIG. 3, a method 70 for playing casino poker includes providing a poker deck, chance device, and wagering surface in a set-up step 72; receiving bets on a full poker hand and/or subset thereof in a wager receiving step 74; dealing a plurality of poker hands in a dealing step 76; operating the chance device for determining one of the dealt poker hands in a chancing step 78, exposing a subset such as a single ("boss") card of the determined hand in a first exposing step 80, and paying winners and collecting from losers in a first paying step 82. The method further includes exposing the remaining cards of the determined poker hand in a second exposing step 84, and paying winners and collecting from losers in a second paying step 86.

It will be understood that the cards of the other (non-determined) poker hands, as well as un-dealt cards of the deck 20 are preferably removed and passed to a discard bin (not shown) following the chancing step 78.

When the roulette wheel is chosen as the chance device, it will be understood that the chancing step 78 includes spinning the wheel in one direction and releasing the roulette ball in the opposite direction, the slot into which the ball finally rests arbitrarily determining which of the poker hands is to be played. As shown in FIG. 2 and described above, the numbers 1-6 can determine the hand numbered "1", 7-12 can determine the hand numbered "2", and so-on through the numbers 31-36 determining the hand numbered "6". It will be understood that other determining schemes can be used, such as the numbers 1, 7, 13, 19, 25, and 31 determining the hand numbered "1" through the numbers 6, 12, 18, 24, 30, and 36 determining the hand numbered "6".

Special rules can be in place for occurrence of the numbers 0, and 00 (when an "American" style roulette wheel is used), from operation of the roulette wheel 16. For example, and as further shown in FIG. 2, the roulette number 0 ("PIC") arbitrarily determines the hand numbered "2", and the number 00 ("JOKER") determines the hand numbered "5", it being understood that other alternative determinations can be defined. The special rules can additionally require that if the ball lands in the 0 "PIC" slot, only subset bets on the corresponding "0" space 66 are paid off, and if the ball lands in the 00 "JOKER" slot, only subset bets on the corresponding "00" space 68 are paid off in the first paying step (all other bets placed in the subset betting region 24 being lost), the first exposing step 80 being combined with the second exposing step 84 in that round.

When the die 18 is chosen as the chance device, the side resting up after a roll of the die defines the poker hand to be played. For example when using a conventional six-sided die having indicia corresponding to the numerals 1-6, the "rolled number" directly defines the correspondingly numbered dealt hand to be the determined hand to be played. Other special rules can also apply; for example, two extra cards are preferably added to the regular 52-card poker deck 20, namely a "PIC" card and a "JOKER" card. It is known that conventional poker card decks initially have a pair of joker cards which are normally removed when playing poker, so it will be understood that one of these can simply be placed into the deck 20, the other being suitably marked such as with "PIC" and also placed into the deck 20. (It will be understood that the poker deck 18 can be initially provided with separately printed "PIC" and "JOKER" cards.) Further, should the first exposing step 80 reveal one of the added cards, only subset bets on the corresponding "0" 66 or "00" space 68 are paid off, all other bets being lost. Moreover, and as previously defined before play to that round begins: should either or both of the added cards be turned up in the second exposing step 84, either (a) all bets placed in the poker hand betting region 27 also lose, or (b) the hand is declared a "PUSH" and all bets placed in the poker hand betting region 27 are declared a "DRAW" and players do not lose their bets.

In the following examples, a player's net winnings are described. In a first example, the player bets one dollar each on the 8 of Hearts (in the single card array 40), Full House (space 36), Any Eight (space 48), Any Club (space 56), Black (space 62), Even (space 64), and PIC (space 66). In the first exposing step, the dealer turns over the Boss card, which happens to be the 8 of Hearts. Thus in the first paying step 82, the 8 of Hearts space wins and pays (50 to 1) $50.00, the Any Eight space wins and pays (13 to 1), and the Even space wins and pays (2.5 to 1) $2.50, but each of the Any Club, Black, and PIC (spaces 56, 62, and 66) loses. Accordingly and to this point in the round, the player's gross winnings are $63.50 and his gross losses are $3.00 In the second exposing step 84, the dealer turns up the 8 of Diamonds, the 8 of Spades, the Jack of Hearts, and the Jack of Clubs, the completed hand also including the 8 of Hearts Boss card. Thus in the second paying step 86, the Full House space wins and pays (649 to 1) $649.00, that being the only bet of that player that was placed in the poker hand betting region. Accordingly the player's final gross winnings in that round are $714.50, the gross losses remain $3.00, the net winnings being $711.50 on bets totaling $7.00.

In a second example, the player bets one dollar each on the Joker, the Queen of Hearts, Red, Odd, Any Spade, the King of Clubs, and Flush Hand. The Boss card is the Joker, so that the Joker space wins and pays (50 to 1) $50, and each of the other subset bets (totaling $5.00) lose. The round is halted at that point because the game rules (previously agreed-to) state that the Joker cannot be used to complete a stud poker hand. Thus the Flush Hand bet loses ($1.00), the player's gross winnings being $50, the gross losses being $6.00, for net winnings of $44.00 on bets totaling $7.00.

In a third example, the player bets one dollar each on the 10 of Diamonds, the Jack of Hearts, Trey of Clubs, Odd, Red, Any Diamond, and Four of a Kind. The Boss card is the 10 of Diamonds, so that the 10 of Diamonds space wins (50 to 1) and pays $50.00, the Red space wins and pays (1 to 1) $1.00, and the Any Diamond space wins and pays (4 to 1) $4.00, and each of the other subset bets (Jack of Hearts, Trey of Clubs, and Odd) lose; the player's gross winnings and loses to that being $55.00 and $3.00, respectively, for net winnings of $52.00 to that point in the round. The remaining four cards are turned up: the Trey of Spades, the 6 of Hearts, the 9 of Clubs, and the King of Hearts, making (with the 10 of Diamonds Boss card) a King high "No Pair" poker hand so that the bet placed on the Four of a Kind space loses. Accordingly, the player's gross earnings remain $55.00, the gross losses becoming $4.00, for net winnings of $51.00 on bets totaling $7.00.

As described above the casino poker game of the present invention combines challenges of playing both roulette and stud poker, providing more subset betting options than roulette, and permitting any number of players instead of the limited number allowed in standard poker. A player can separately place bets on the subset betting spaces (as in roulette), the poker hand spaces, or both. By combining both classes of bets in a single betting interval rapid play of each round is facilitated, for greatly enhanced effectiveness in casino environments.

Although the present invention has been described in considerable detail with reference to certain preferred versions thereof, other versions are possible. For example, other poker games such as seven-card stud can be played with the apparatus 10 of the present invention, and the first exposing step 80 can include exposing a second "BOSS" card. Also, the present invention is not limited to a casino environment, being also suitable for play in home or other private settings. Therefore, the spirit and scope of the appended claims should not necessarily be limited to the description of the preferred versions contained herein.

What is claimed is:

1. A method for playing a casino poker game, comprising the steps of:

(a) providing a chance device;

(b) providing a poker deck of playing cards;

(c) providing a wagering surface having indicia for betting options that include options regarding a subset of a dealt poker hand as well as the full hand;

(d) receiving bets in a first playing interval;

(e) dealing a plurality of poker hands in a second playing interval;

(f) operating the chance device for determining one of the poker hands to play;

(g) exposing the subset only of the determined playing hand;

(h) paying winners and collecting from losers regarding the subset betting options;

(i) then, after the step of paying regarding the subset betting options, exposing the remaining cards of the determined hand; and (j) paying winners and collecting from losers regarding the full hand betting options.

2. The method of claim 1, wherein the chance device comprises a standard roulette wheel having 36 numbered betting slots and a zero slot, and operating the chance device comprises spinning the roulette wheel.

3. The method of claim 2, wherein the plurality of poker hands is not greater than six for five-card hands and not greater than five for seven-card hands for there to be a sufficient number of cards in the deck to deal the hands.

4. The method of claim 3, wherein the number of poker hands is a sub-multiple of 36, equal numbers of the numbered slots prospectively designating respective ones of the dealt hands, the zero slot also prospectively designating one of the dealt hands.

5. The method of claim 4, wherein the zero slot additionally defines a sole winning subset betting option.

6. The method of claim 4, wherein the roulette wheel additionally includes a double-zero slot, the double zero slot prospectively designating a different one of the dealt hands, and the poker deck consists of 52 cards.

7. The method of claim 6, wherein the double-zero slot additionally defines another sole winning subset betting option.

8. The method of claim 4, wherein the number of poker hands is six, six each of the numbered slots prospectively designating respective ones of the dealt hands.

9. The method of claim 2, wherein the poker deck consists of 52 cards.

10. The method of claim 1, wherein the chance device comprises a die having different indicia on each of opposite parallel sides, and operating the chance device comprises rolling the die onto a substantially level surface, one of the indicia coming to rest on top of the die for determining the hand to be played.

11. The method of claim 10, wherein the poker deck of cards includes first and second additional cards, the additional cards defining respective sole winning subset betting options.

12. The method of claim 10, wherein the poker deck of cards consists of 54 cards.

13. The method of claim 10, wherein chance device consists of a single die.

14. The method of claim 10, wherein the die is a six-sided die, and the number of poker hands is six.

15. A method for playing a casino poker game, comprising the steps of:

(a) providing a roulette wheel having 36 numbered slots, a "0" slot, and a "00" slot;

(b) providing a poker deck of 52 playing cards;

(c) providing a wagering surface having indicia for betting options that include subset betting options regarding a single card of a dealt five-card stud poker hand as well as the full hand;

(d) receiving bets in a first playing interval;

(e) dealing a plurality of poker hands in a second playing interval;

(f) operating the roulette wheel for determining one of the poker hands to play;

(g) exposing the single card of the determined playing hand;

(h) paying winners and collecting from losers regarding the subset betting options;

(i) then, after the step of paying regarding the subset betting options, exposing the remaining cards of the determined hand; and (j) paying winners and collecting from losers regarding the full hand betting options.

16. The method of claim 15, wherein the "0" and "00" slots of the roulette wheel each define respective ones of the poker hands.

17. The method of claim 15, wherein the "0" and "00" slots of the roulette wheel each define respective sole winning subset betting options.

18. A method for playing a casino poker game, comprising the steps of:

(a) providing a single six-sided die;

(b) providing a poker deck of playing cards consisting of 52 regular cards and two additional cards;

(c) providing a wagering surface having indicia for betting options that include subset betting options regarding a single card of a dealt five-card stud poker hand as well as the full hand;

(d) receiving bets in a first playing interval;

(e) dealing six poker hands in a second playing interval;

(f) rolling the die onto a substantially level surface, one of the indicia coming to rest on top of the die for determining one of the poker hands to play;

(g) exposing the single card of the determined playing hand;

(h) paying winners and collecting from losers regarding the subset betting options;

(i) then, after the step of paying regarding the subset betting options, exposing the remaining cards of the determined hand; and (j) paying winners and collecting from losers regarding the full hand betting options.

19. The method of claim 18, wherein each of the additional cards of the poker deck define respective ones of the poker hands to be played.

20. The method of claim 18, wherein each of the additional cards of the poker deck define respective sole winning subset betting options.

* * * * *